(12) United States Patent
Walker

(10) Patent No.: X9852
(45) Date of Patent: Jul. 1, 1836

(54) HYDRANTS

(76) Inventor: Sater T. Walker

Walter T. Walker
The Schedule referred to in these Letters Patent and making part of the same,
containing a description in the words of the said Walter T. Walker himself
of his improvement in the Hydrant for drawing Water.
To all to whom these presents shall come: Be it known, That I Walter
T. Walker of the City & County of Baltimore & State of Maryland, have
invented a new improvement in "the Hydrant for drawing water"
which Hydrant I have already patented under date of the twenty sixth
of November, in the year eighteen hundred and thirty five, and that the
following is a full and exact description of the construction & operation of
the said improvement as invented by me. The said invention consists
of an Iron Case, which will be usually cast, and is to surround the
works so as to afford them the requisite protection. It is also used for
the purpose of maintaining the distance between the upper and lower
ends of the works, lest they should be separated by frost or other cir-
cumstances. The ascending tubes from the supply pipes from which
the water is discharged, is as usual supported by means of a wooden
log, according to my the mode of construction; but I have adopted
a cast-iron case with openings in one or more of its sides, at the base near
its bottom, for the purpose of approaching the works at the lower end
whenever it may be requisite so to do, and for supporting the valve
seat or cock. The spear or shaft described in my former patent,
as passing down from the top of the Hydrant to the valve seat, has
a screw on its upper end which passes into or through a nut plate,
or the covering affixed to the upper end of the cast-iron case, and on
turning the spear, as usual, the valve is raised or closed. I insert
the waste cock, when that is used, within the opening in the cast iron
case under ground and turn off the water according to my first plan.
When I use the lining of some pliable substance, in the cock and in
the valve seat, I generally prefer leather saturated with bees-wax
and apply it to the Hydrant, or fire plug cocks, by attaching it
firmly to the body or plug of the cock. When I use the metal
cock upon an enlarged scale for the use of the fire plugs and others
to operate it within the cast iron case, I make the discharging end of the cock to turn upwards within the body of the case, and form to it a bell
end, so as to receive the spigot end of the ascending pipe to which I attach
one or more nozles for the discharging of the water by, so as to be able to
attach one or more hose to the same plug, or for the purpose of having a
convenient mode of attachment at or near the surface of the ground;
it also answers in this case to increase the head of water, and removes the
possibility of obstruction of the flow of water, from a bend or pressure that
might otherwise be in the hose when elevated. To the other end of
the cock I form a bell end and unite it to the supply pipe by a
circular pipe intended for the purpose of reversing the front of the case, and
the discharging pipe, so as to discharge the water in the same direction it
was received from. I use the coupling joints for connecting the pipes, as
in my old patent, for the purpose of affording a ready means of detaching
them from the cock or valve seat. To preserve at all times the same
distance between the upper and [illegible] ends of the works; to prevent sep-
aration by frost or other circumstances as before stated, the cock or valve
seat, is placed in the opening in the lower end of the iron case, and the
end plate, or covering in which the spear or shaft works, which is used
for raising the valves, likewise the one used for turning the plug of
the cock, has a screw cut in it, & receives into it the one on the upper end
of the spear, where the lever is attached. What I claim as my in-
vention, and for which I now ask Letters Patent, is the construction and
use of a cast iron case, for the purpose of maintaining the distance
as described, either with or without the hollow leg. Also the iron case
for protecting the other works of the hydrant, and fire plug, from
injuries. But when it is used only as a covering, it is placed around the
other works without the connection for maintaining the distance. And
the confining down of the top by means of screw bolts and nuts, intended
to assist in easing and tightening the works. Likewise for adding nozles or
mouthpieces to the discharging pipes for the purposes before mentioned,
in describing the fire plug. Also for the manner of using a circular
pipe to the fire plug for reversing the nozle, or front of the discharging
pipe or case.

Peter T. Walker

[illegible]

Thos B. [illegible]
[illegible] } Witnesses 858 words (Patented 2d July 1836)

[illegible]

United States Patent
Patent No.: X9852
NO PRINTED SPECIFICATIONS AVAILABLE
S. T. Walker,
Hydrant.
Reissued July 1, 1836.
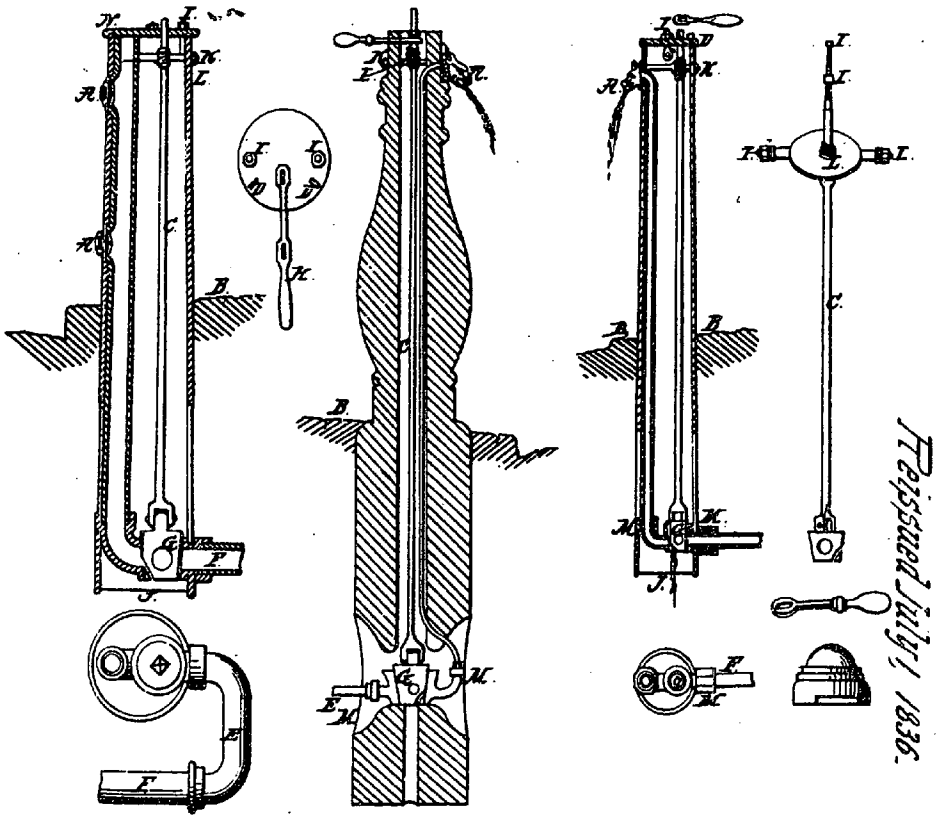
N. PETERS, PHOTO-LITHOGRAPHER, WASHINGTON, D. C.